United States Patent [19]
Kofsman et al.

[11] Patent Number: 5,804,228
[45] Date of Patent: Sep. 8, 1998

[54] MINIMUM VESTIGE NOZZLE ASSEMBLY FOR PLASTICS INJECTION MOLDING

[75] Inventors: Michael Kofsman, Granda Hills; Alan N. McGrevy, Chino; Charles R. Kroeger, Upland, all of Calif.

[73] Assignee: Caco Pacific Corporation, Covina, Calif.

[21] Appl. No.: 700,959

[22] Filed: Aug. 21, 1996

[51] Int. Cl.⁶ .................................................. B29C 45/20
[52] U.S. Cl. ........................ 425/549; 264/328.15; 425/568
[58] Field of Search .................. 425/549, 568; 264/328.15

[56] References Cited

U.S. PATENT DOCUMENTS

| | | | |
|---|---|---|---|
| 3,632,248 | 1/1972 | Reinfeld | 425/157 |
| 4,588,367 | 5/1986 | Schad | 425/549 |
| 4,902,218 | 2/1990 | Leonard et al. | 425/549 |
| 5,098,280 | 3/1992 | Trakas | 425/549 |
| 5,318,434 | 6/1994 | Gellert | 425/549 |
| 5,501,594 | 3/1996 | Glozer et al. | 425/549 |
| 5,513,976 | 5/1996 | McGrevy | 425/549 |
| 5,609,893 | 3/1997 | Eastwood | 425/549 |

FOREIGN PATENT DOCUMENTS

| | | |
|---|---|---|
| 0326016 | 1/1989 | European Pat. Off. . |
| 0337454 | 4/1989 | European Pat. Off. . |
| 0614745 | 3/1994 | European Pat. Off. . |
| 4310566 | 9/1994 | Germany . |
| 9621548 | 7/1996 | WIPO . |

OTHER PUBLICATIONS

The Condensed Chemical Dictionary, p. 126, 1981.

*Primary Examiner*—Tim Heitbrink
*Attorney, Agent, or Firm*—Sheldon & Mak

[57] ABSTRACT

A hot tip nozzle assembly for injection molding plastic components comprises a nozzle housing defining a hot runner passage and a nozzle tip section which is received in the hot runner passage. The nozzle tip section defines a hot runner tip passage in flow communication with the hot runner passage. The nozzle tip section slides freely within the hot runner passage during injection molding. A stop is provided on the nozzle tip section to limit downward movement relative to the cavity gate and automatically position the nozzle tip relative to the injection gate of the mold. In addition, axial thermal expansion of the nozzle housing is not imparted to the nozzle tip section. The nozzle tip section also has a restricted length that can axially thermally expand. Accordingly, the position of the nozzle tip is only minutely affected by even larger temperature changes in the nozzle assembly. This controlled thermal expansion together with the sliding movement of the nozzle tip section relative to the nozzle housing maintains the nozzle tip at a substantially constant position during the injection molding operation and minimizes vestige formation in the molded components.

21 Claims, 4 Drawing Sheets

MINIMUM VESTIGE NOZZLE ASSEMBLY FOR PLASTICS INJECTION MOLDING

BACKGROUND

The invention relates to plastic injection molding apparatuses for molding plastic components and, more particularly, to a hot tip nozzle assembly which minimizes and controls the formation of vestiges in molded plastic components.

Pressure injection molding nozzle assemblies for molding plastic components comprise a nozzle housing and a nozzle tip, commonly referred to as a "hot tip." In the known assemblies, the nozzle tip is fixedly secured to the nozzle housing, typically by mating threads formed in the nozzle housing and on the nozzle tip, to prevent relative movement. The nozzle assembly is fixtured in the mold plates and the nozzle tip is positioned relative to the injection gate.

In operation, a plastic resin melt is supplied to the nozzle assembly from a manifold and directed into the mold cavity through the hot runner passage defined by the nozzle housing and the nozzle tip. Temperature changes and heating effects occur during this process that have important effects on the injection molding nozzle assembly. Such temperature changes are required for molding various plastics. The temperature changes cause thermal expansion of the hot runner system, affecting the dimensional stability of the nozzle assembly and, consequently, the quality of the formed plastic components in the known nozzle assemblies.

Thermal effects can result in the plastic components having unacceptable vestiges. A vestige is a visible surface flaw such as a bump, stringing or raised material that may form on the component surface during the injection molding process. Vestiges may occur due to improper nozzle tip positioning relative to the injection gate during the injection molding process. The plastic resin melt is injected at a high temperature into the injection gate of the cooled mold core. Following injection and after the cooling cycle, the component is moved away from the nozzle tip. A residual amount of the plastic resin melt can be sheared away with the component, forming a vestige.

Vestiges can vary in size and shape in molded plastic components, generally depending on the nozzle tip position relative to the injection gate. Some vestiges may be acceptable in certain applications where the surface condition is not critical. Vestiges are unacceptable, however, in plastic components that require a near flawless outer surface, such as various medical components and components requiring a highly cosmetic appearance. When poor vestiges occur in such components, the components must be scraped at a financial loss to the manufacturer.

Attempts have been made to reduce the problem of vestige formation. These attempts have typically included calculating the expected thermal expansion of the nozzle assembly at a specific temperature and constructing an apparatus, that when operated at that temperature, expands by such an amount that the nozzle tip is placed in the ideal position relative to the injection gate and to the component. The ideal position is substantially flush with the component. This approach requires that the nozzle assembly components be machined to precise size tolerances because component dimensions are critical to achieving the ideal nozzle tip placement. Accordingly, manufacture of the known nozzle assemblies is highly demanding.

This known approach to nozzle tip positioning has proved to be somewhat unsatisfactory due to the influence of variables during the actual injection molding process. Factors such as the actual thermocouple sensor position, the plastic resin melt composition, and the composition of the nozzle assembly components, can significantly affect the actual position of the nozzle tip during operation, as the nozzle assembly expands and contracts due to wide temperature fluctuations. These and other factors can cause the position of the nozzle tip to move from the ideal position, resulting in the formation of poor vestiges on the components.

The known nozzle assemblies are often unable to compensate for such variable factors and achieve a substantially constant nozzle tip position during the injection molding process. If the temperature inside of the nozzle assembly is not accurately sensed, excessive heat can be applied to the nozzle assembly, causing it to be overheated. This overheating produces greater expansion of the nozzle assembly than calculated to place the tip at the ideal position and, consequently, results in the nozzle tip being positioned too close to the injection gate.

The plastic resin melt composition also affects the nozzle tip position. If the nozzle assembly is used to inject a plastic resin material having a processing temperature different from that of the material used to calculate the ideal tip placement, the corresponding temperature change in the nozzle assembly can result in the nozzle tip being displaced from the ideal position due to the different amount of thermal expansion.

The change in length due to thermal expansion of a given component is equal to the product of the temperature change, the coefficient of thermal expansion of the component material, and the portion of the total length of the component that can expand when heated. For example, increasing the temperature of a three inch long steel component by 100° F. due to overheating produces a corresponding linear thermal expansion of about 0.002 inch. This amount of expansion is typical in the known nozzle assemblies due to overheating as a result of inadequate temperature control. Raising the temperature of the same component from ambient temperature to 500° F. causes a linear expansion of about 0.008 inch. Temperature changes of this magnitude are typical in plastic injection molding processes between the cold, ambient temperature, condition and the operating temperature. The resultant expansion of the nozzle assembly is sufficient to change the position of the fixedly attached nozzle tip from the ideal position and, consequently, cause poor vestige formation in the molded components.

Thus, there is a need for a hot tip nozzle assembly for use in injection molding of plastics that (i) controls the thermal expansion of the nozzle assembly so as to maintain a substantially constant nozzle tip position during processing, such that vestige formation on the manufactured parts is minimized; (ii) achieves a substantially constant nozzle tip position for various plastic resin materials having different processing temperatures; (iii) comprises an automatic positioning nozzle tip that achieves precise location during operation; (iv) has less areas requiring precise machining tolerances and is easier to manufacture than the known nozzle assemblies; and (v) does not require precise locating of the nozzle tip during assembly of components.

SUMMARY

The present invention is directed to a hot tip nozzle assembly for use in injection molding processes for plastic components that satisfies the above needs. The nozzle assembly (i) limits thermal expansion so as to maintain a substantially constant tip position, such that vestige formation is minimized; (ii) achieves a substantially constant tip position for various plastic resin materials having a range of processing temperatures; (iii) comprises an automatic positioning nozzle tip that achieves precise locating during operation; (iv) has less areas requiring precise manufacturing tolerances and is easier to manufacture than the known nozzle assemblies; and (v) does not require a precise locating of the nozzle tip during assembly of components. In addition, the nozzle assembly comprises a versatile nozzle housing compatible with various nozzle tip configurations.

The present invention comprises a nozzle assembly for injecting a plastic resin melt into a mold cavity through a gate. The nozzle assembly comprises a nozzle housing and a nozzle tip section. The nozzle housing defines an axial hot runner passage therethrough for flowing a plastic resin melt. The nozzle tip section is received in the hot runner passage and is axially movable relative to the nozzle housing. The nozzle tip section defines an axial hot runner tip passage in flow communication with the hot runner passage for flowing the plastic resin melt.

The nozzle housing is typically formed of steel. A case hardened inner surface is preferably formed in the nozzle housing to provide high lubricity so as to enhance sliding movement between the nozzle housing and the nozzle tip section. The inner surface is typically case hardened by a nitriding process.

The nozzle tip section comprises a nozzle tip retainer which comprises the nozzle tip and defines the hot runner tip passage. The hot runner tip passage can be straight, or it can optionally be spiral shaped.

The nozzle tip retainer is preferably formed of a material having a higher coefficient of thermal expansion than the material forming the nozzle housing. Typically, the nozzle tip retainer is formed of a material such as beryllium-copper. This difference in the coefficients of thermal expansion of the two materials provides a plastic resin melt seal between the nozzle housing and the nozzle tip section at the operating temperature. This seal also allows the nozzle tip section to slide within the axial hot runner passage. The nozzle tip retainer is preferably also nickel plated to reduce wear and erosion and also to provide a slippery outer surface.

The nozzle tip section comprises stop means for limiting axial movement thereof relative to the gate. The stop means ensures that the nozzle tip is properly positioned relative to the gate during the injection molding process to minimize vestige formation.

The stop means also controls linear thermal expansion by restricting the length of the nozzle tip section that can thermally expand. Accordingly, even as the temperature of the nozzle assembly is increased, the nozzle tip section only minimally thermally expands such that the position of the nozzle tip relative to the gate remains substantially constant.

DRAWINGS

These and other features, aspects and advantages of the present invention will become better understood from the following drawings, description and appended claims, wherein:

DESCRIPTION

Figure 1:
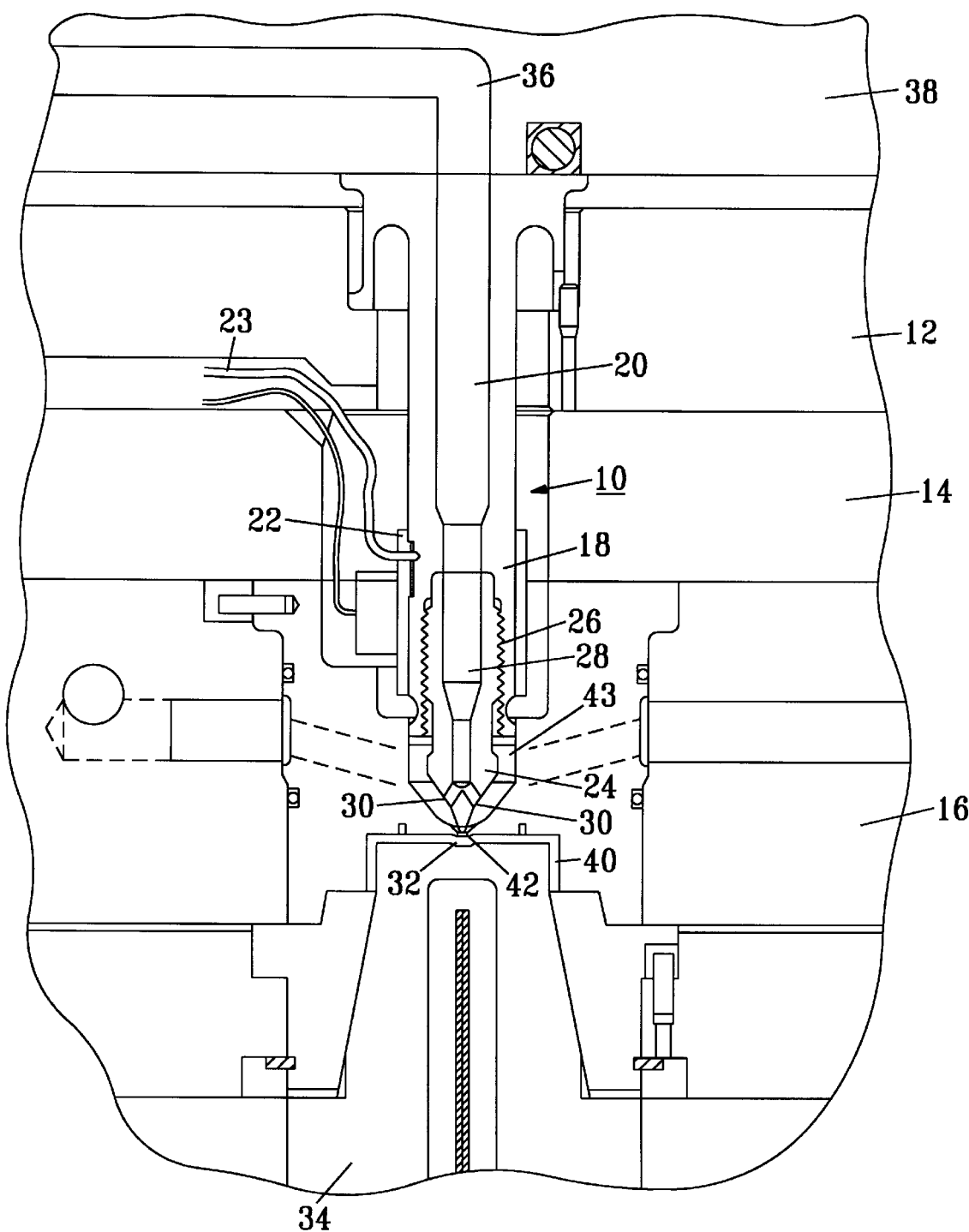
FIG. 1 is a section view of a conventional injection nozzle assembly for use in molding plastic components as fixtured in the mold plates and the mold cavity, illustrating the non-stable injection position of the nozzle tip relative to the injection gate and component.

As illustrated in the drawings, the present invention is directed to a hot tip nozzle assembly 50 for injection molding plastic components. The nozzle assembly 50 produces improved quality components, having minimal vestiges, as compared to the known nozzle assemblies.

A typical known nozzle assembly 10 is illustrated in FIG. 1. As shown, the nozzle assembly 10 is fixed in a retainer plate 12, a cavity retainer plate 14 and a mold cavity plate 16, such that the nozzle assembly 10 is vertically oriented.

The nozzle assembly 10 comprises a nozzle housing 18 which defines an axial hot runner passage 20. A heating unit 22 surrounds a portion of the nozzle housing 18.

A nozzle tip section 24 is attached at the lower end of the nozzle housing 18. The nozzle tip section 24 is commonly referred to as a "hot tip." The nozzle tip section 24 includes external threads which engage internal threads formed in the nozzle housing 18 as depicted at 26, to fixedly attach the nozzle tip section 24 to the nozzle housing 18. The nozzle tip section 24 defines a hot runner tip passage 28 in flow communication with the hot runner passage 20 formed in the nozzle housing 18, and a pair of nozzle tip openings 30 through which a plastic resin melt is injected through an injection gate 32 and which is disposed on a mold core 34.

A plastic resin melt is supplied to the nozzle assembly 10 through a melt passage 36 of a supply manifold 38. The plastic resin melt is flowed through the hot runner passage 20 and hot runner tip passage 28, and directed through the nozzle tip openings 30, into the gate well 43 and through the injection gate 32. The plastic resin melt flowed through the nozzle assembly 10 is heated by the heating unit 22 controlled by a thermocouple 23. Upon cooling of the plastic resin, a molded component 40 is formed.

The known nozzle assembly 10 relies on axial thermal expansion for nozzle tip placement and consequently is unable to consistently produce molded plastic components having minimal vestiges. During operation, the nozzle housing 18 axially thermally expands due to changes in the operating temperature. The nozzle tip section 24, being fixedly attached to the nozzle housing 18, must also move axially along with the nozzle housing 18 as it expands. As a result, the position of the nozzle tip 42 is changed. The nozzle tip 42 position is not controlled. As the length of the nozzle housing 18 and the tip section 24 increase, and the temperature change increases, the amount of thermal expansion increases. This increased expansion causes an increased change in the position of the nozzle tip 42 relative to the injection gate 32. If the nozzle tip 42 moves downwardly too great a distance due to this expansion, the nozzle tip 42 can protrude into the component, resulting in unsuitable vestige problems. Vestige problems can also occur if the thermal expansion is less than calculated and the nozzle tip 42 is consequently positioned too far from the injection gate 32.

The nozzle assembly 50 according to the present invention overcomes the problem of thermal expansion and produces components of high quality with minimal vestiges. This is achieved by controlling thermal expansion and restricting the nozzle tip movement during the injection molding process. The nozzle tip section is also automatic positioning. Thus, the nozzle assembly can be used to process a variety of plastic resin materials having different processing temperatures without ever having to use a different nozzle assembly. This feature of the nozzle assembly 50 liberalizes the range of machining tolerances that are required as compared to the known nozzle assemblies and, consequently, makes the nozzle assembly 50 easier to manufacture.

In addition, the nozzle assembly 50 has increased versatility in that it comprises a nozzle housing which is compatible with a variety of nozzle tip section configurations.

Figure 2:
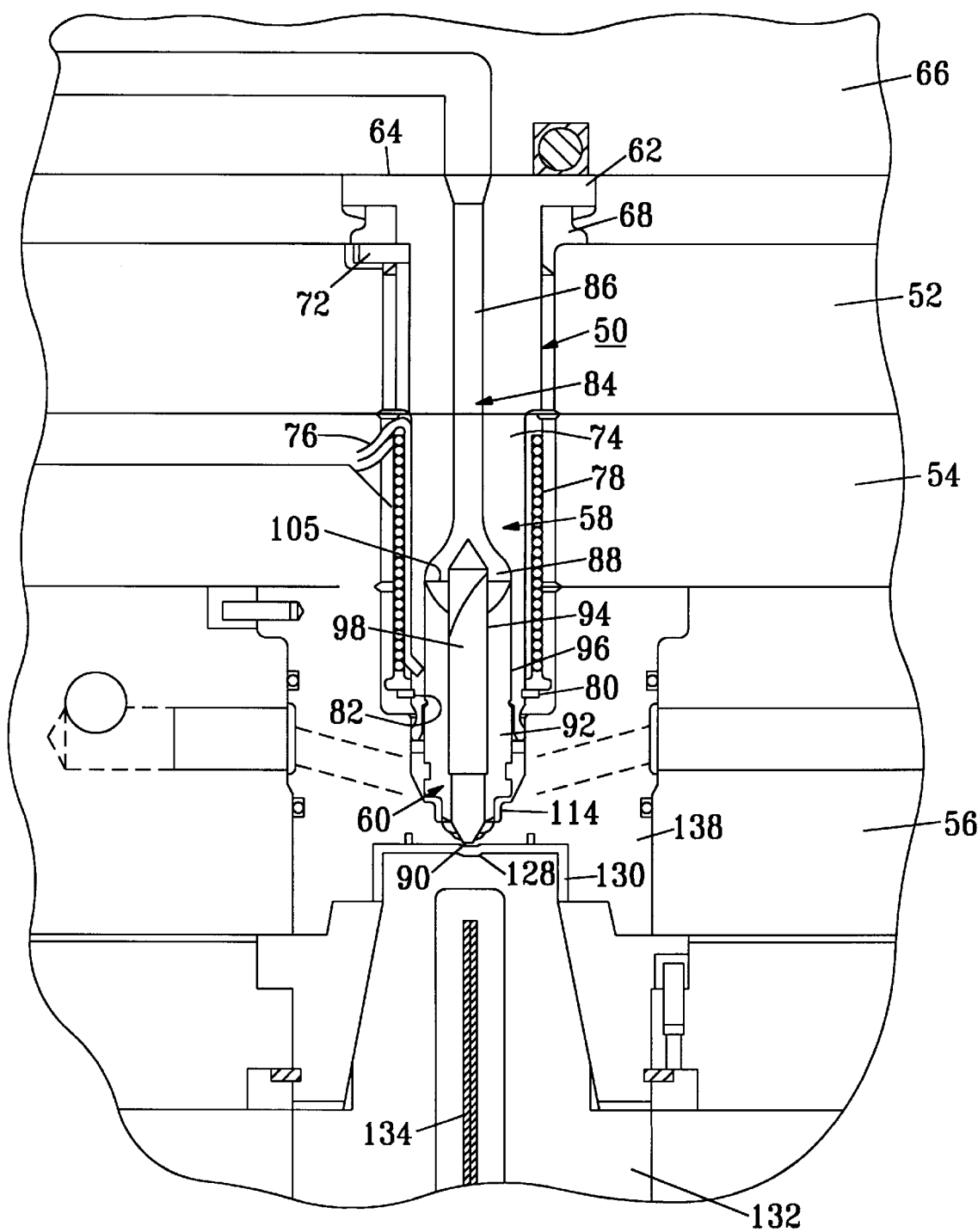
FIG. 2 is a section view of an injection nozzle assembly according to the present invention illustrating the stable injection position of the nozzle tip relative to the injection gate and component.

Referring to FIG. 2, the nozzle assembly 50 is shown fixtured in a manifold plate 52, a cavity retainer plate 54 and a cavity plate 56. The nozzle assembly 50 comprises a nozzle housing 58 and a nozzle tip section 60 which is freely slidably received within the nozzle housing 58, as described in greater detail hereinbelow. The nozzle tip section 60 comprises a nozzle tip 90.

The nozzle housing 58 includes an upper portion 62 having an upper surface 64 substantially flush with a plastic resin melt manifold 66.

A locating tensioner collar 68 is fitted on the nozzle housing 58 and supported by the manifold plate 52. A timing dowel 72 extends through a bore (not shown) formed in the locating tensioner collar 68. The locating tensioner collar 68 holds the nozzle housing 58 against the manifold 66 during the cold mold start up procedure, minimizing the possibility of a plastic resin leak between the nozzle housing 58 and the manifold 66 if the plastic resin is prematurely injected prior to the mold reaching the operating temperature.

The nozzle housing 58 comprises a reduced outer diameter portion 74 which may be flush at one end with the cavity retainer plate 54. A longitudinal groove (not shown) is formed in the outer surface of the portion 74. A thermocouple 76 is positioned in the groove to monitor the temperature of the nozzle housing 58.

A band heater 78 is disposed on the portion 74 and surrounds the thermocouple 76. The band heater 78 applies a controlled amount of heat to the nozzle housing 58, based on the temperature sensed by the thermocouple 76. A retainer ring 80 is fitted in a circumferential groove 82 formed in the nozzle housing 58 to prevent axial movement of the band heater 78.

The nozzle housing 58 defines an axial hot runner passage 84 having an upper portion 86 and an expanded lower portion 88. The cross-sectional area of the lower portion 88 is typically from about 2–3 times greater than that of the upper portion 86. The nozzle tip section 60 is received in the expanded lower portion 88. The thermocouple 76 is positioned in close proximity of the lower portion 88 and the nozzle tip section 60. The nozzle tip section 60 is slidably received within the lower portion 88 so that the nozzle tip section 60 is able to slide within the lower portion 88 during the injection molding process. Consequently, any thermal expansion of the nozzle housing 58 is not imparted to the nozzle tip section 60. This non-fixed construction enables the nozzle tip 90 to remain in the ideal position during the injection molding operation as described below, and, as a result, minimizes the formation of undesirable vestiges in the molded components 130. The nozzle housing 58 is preferably case hardened by a process such as nitriding to provide an inner surface having high hardness and high lubricity to enhance sliding movement.

Figure 3:
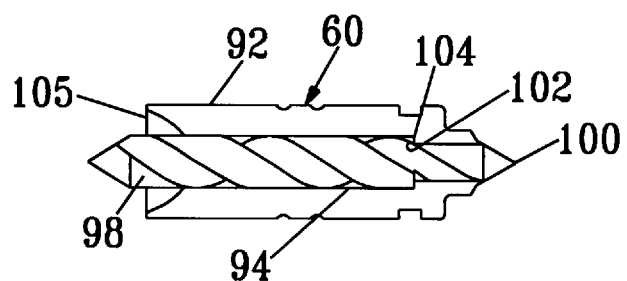
FIG. 3 illustrates an embodiment of a nozzle tip section for use in the nozzle assembly of the present invention.

Referring to FIG. 3, the nozzle tip section 60 comprises a nozzle tip retainer 92 which defines a hot runner tip passage 94 therethrough in flow communication with the hot runner passage 84 in the nozzle housing 58. The nozzle housing 58 is typically formed of steel which has a low coefficient of thermal expansion. The nozzle tip retainer 92 is formed of a material, such as beryllium-copper, having a higher coefficient of thermal expansion than the steel nozzle housing 58. There is a running clearance typically of about 0.0006 in. to about 0.0008 in. between the outer surface of the nozzle tip retainer 92 and the inner surface of the nozzle housing 58, as depicted at 96 in FIG. 2, in the cold condition of the nozzle assembly 50. This clearance is selected so that at the operating temperature of the nozzle assembly 50, the nozzle tip retainer 92 expands radially outwardly a greater distance than does the nozzle housing 58, thereby forming a seal between the nozzle tip retainer 92 and the nozzle housing 58. This seal reduces leakage of the plastic resin melt between the nozzle tip retainer 92 and the nozzle housing 58, and also increases the heat transfer area between the nozzle tip retainer 92 and the nozzle housing 58 as compared to the known nozzle assembly 10, in which the nozzle tip section 24 is threaded to the nozzle housing 18.

The nozzle tip retainer 92 is preferably nickel plated to reduce wear and erosion, and also to provide a slippery outer surface which allows the nozzle tip section 60 to form the seal with the nozzle housing 58, yet also allows the nozzle tip section 60 to slide freely axially relative to the nozzle housing 58 due to hydraulic pressure within the hot runner system.

A spiral flow tip member 98 including the nozzle tip 90 is disposed within the nozzle tip retainer 92. The spiral flow tip member 98 includes a shoulder 102 which abuts a shoulder 104 formed in the nozzle tip retainer 92. The spiral flow tip member 98 is preferably formed of a material having high abrasion resistance to plastics, such as high speed steels. The spiral flow tip member 98 is typically brazed to the nozzle tip retainer 92. The plastic resin melt is sheared as it flows axially over the spiral flow tip member 98. The spiral flow tip member 98 provides a washing action to the plastic resin melt which, when the color of the plastic resin melt fed into the nozzle assembly 50 from the manifold 66 is changed, enhances removal of the original colored plastic resin melt from the hot runner system so that components of the new color are produced more quickly. The plastic melt resin emerges from the nozzle tip section 60 at the nozzle tip 90.

Figure 4:
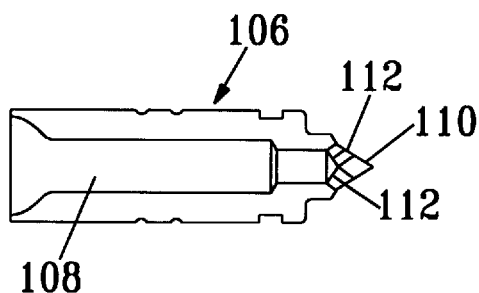
FIG. 4 illustrates an alternative embodiment of a nozzle tip section for use in the nozzle assembly of the present invention.

FIG. 4 illustrates an alternative embodiment of the nozzle tip section 106 which can be used in the injection nozzle assembly 50. The nozzle tip section 106 defines a straight passage 108 through which the plastic resin melt is flowed. The nozzle tip section 106 has a unitary construction and comprises a tip portion 110 having a pair of holes 112 extending therethrough at an angle relative to the axis of the passage 108. The plastic resin melt emerges from the nozzle assembly through the holes 112.

Figure 5:
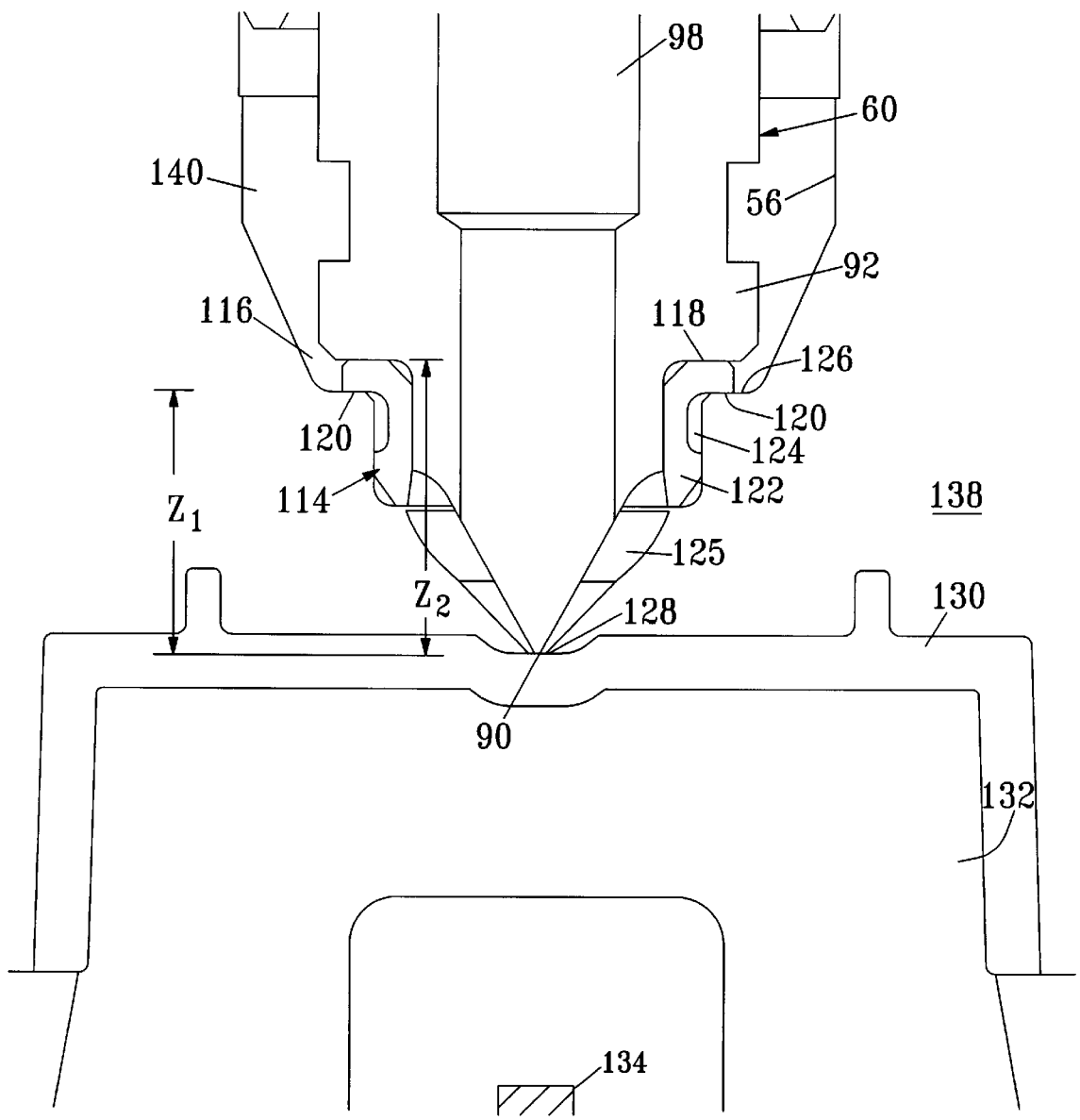
FIG. 5 is an enlarged section view of the nozzle tip section of the injection nozzle assembly of FIG. 2 illustrating the automatic positioned location of the nozzle tip.

Referring to FIG. 5, a nozzle tip locator support 114 is mounted to the nozzle tip retainer 92. The nozzle tip locator support 114 comprises an upper portion 116 having an upper face 118 which abuts the nozzle tip retainer 92 and a stop face 120, and a lower portion 122. The outer diameter of the lower portion 122 is slightly less than the width of an air gap 124 in the cavity plate 56 to enable the lower portion 122 to slide within the air gap 124 during the injection molding process. The gate well 140 is predominantly an air gap when cold. The nozzle tip locator support 114 is typically comprised of titanium.

The nozzle tip locator support 114 minimizes the size of the plastic bubble 125 around the nozzle tip 90. If this plastic bubble is too large, degradation of sensitive material due to prolonged residence time and overheating can occur. There can also be a poor color change of the plastic resins if the plastic bubble is too large.

FIG. 5 illustrates the preferred injection position of the nozzle tip section 60 during the injection molding process. As shown, the positive stop face 120 contacts a face 126 of the mold cavity plate 56 in a cavity 138, preventing further downward movement of the nozzle tip section 60 relative to the injection gate 128 and the component 130 supported on a mold core 132. A cooling element 134 is provided in the mold core 132 to rapidly cool the injected plastic resin melt. The distance $Z_1$ between the stop face 120 and the injection gate 128 is fixed. This distance is selected such that, in the depicted fully downward position of the nozzle tip section 60, the nozzle tip 90 is positioned at the preferred position relative to the injection gate 128.

The nozzle tip locator support 114 limits the length of the nozzle tip section 60 that can axially thermally expand in the downward direction so that the nozzle tip 90 is automatically positioned at the preferred position substantially flush with the injection gate 128. Particularly, the expansion length is approximately $Z_2$, which is the distance from the surface 118 of the upper portion 116 to the nozzle tip 90. This length is preferably only about 0.3 inch. A temperature increase of 500° F., for example, produces a thermal expansion of the length $Z_2$ of only about 0.0009 inch for beryllium-copper, resulting in a minute change in position of the nozzle tip 90 relative to the injection gate 128. Such a minute change in the nozzle tip 90 position is much less than the change that occurs in the nozzle tip 42 position as a result of the same temperature change in the nozzle assembly 10. Thus, nozzle assembly 50 overcomes the problem of improper nozzle tip 90 positioning.

During operation of the nozzle assembly 50, a plastic resin melt is supplied from the manifold 66 and flowed through the upper portion 86 of the hot runner passage 84 and into the expanded lower portion 88. The plastic resin melt is sheared as it passes over the spiral flow tip 98 before exiting the nozzle assembly 50. The temperature of the plastic resin melt within the nozzle assembly 50 is controlled by the heating unit 78. The plastic resin melt is injected into the mold through gate 128 and cools to form the plastic component 130.

Referring to FIGS. 2 and 5, the force of the hydraulic pressure in the nozzle assembly 50 during the injection molding process acts on the nozzle tip section 60, causing it to slide relative to the nozzle housing 58. Downward force acts on an upper face 105 due to the larger surface area at this location. Downward movement of the nozzle tip section 60 is limited by the stop face 120 of the nozzle tip locator support 114. When the stop face 120 contacts the face 126 of the cavity plate 56 at the full extent of the nozzle tip section 60 movement, the nozzle tip 100 is in the preferred position relative to the injection gate 128 and the component 130.

The preferred position of the nozzle tip 100 is maintained by the force of the hydraulic pressure exerted on the upper face 105 of the nozzle tip retainer 92 by the plastic resin melt injection pressure. The cross-sectional area at the upper face 105 is greater than the cross-sectional area of the flow passage at the plastic bubble 125, resulting in a downward acting force on the nozzle tip section 60. Thus, the nozzle tip section 60 slides forward during normal operation of the nozzle assembly 50.

Because the nozzle tip 90 position is automatically controlled, the nozzle assembly 50 eliminates the need to precisely manually position the nozzle tip 90 as in the known nozzle assembly 10. This automatic positioning provides several important advantages. Many machining tolerances for the nozzle housing 58 and the nozzle tip section 60 are less precise. Accordingly, the nozzle housing assembly 50 is easier to manufacture.

In addition, the nozzle assembly 50 can be used to mold various plastic melt resins, having a range of processing temperatures, without having to replace the nozzle tip section 60 or manually adjust the position of the nozzle tip 90 relative to the injection gate 128. The nozzle tip 90 is automatically seated relative to the injection gate 128 by the hydraulic pressure of the plastic resin melt and the contact between the stop face 120 and the face 126 of the cavity plate 56. The short length of the nozzle tip locator support 114 significantly limits the length of the nozzle assembly 50 that can thermally expand. This controlled expansion ensures that the nozzle tip 90 remains substantially stationary in the preferred position despite even large temperature changes.

Although the present invention has been described in considerable detail with reference to certain preferred versions thereof, other versions are possible. Therefore, the scope of the appended claims should not be limited to the description of the preferred versions contained herein.

What is claimed is:

1. A nozzle assembly for injecting a plastic resin melt into a mold cavity through a gate, the nozzle assembly comprising:
   a) a nozzle housing defining a hot runner passage therethrough for flowing a plastic resin melt, the hot runner passage having a longitudinal axis;
   b) a nozzle tip section comprising an upper nozzle tip portion and a lower nozzle tip portion, the nozzle tip section defining an axial hot runner tip passage in flow communication with the hot runner passage for flowing the plastic resin melt, the nozzle tip section being freely slidably received within the hot runner passage along the longitudinal axis, such that the nozzle tip section being freely slidable along the longitudinal axis relative to the nozzle housing during injection of the plastic resin melt into the mold cavity; and
   c) limiting means disposed on the lower nozzle tip section for restricting sliding movement of the nozzle tip section, and for restricting thermal expansion of the lower nozzle tip portion, in a direction toward the gate.

2. The nozzle assembly of claim 1, wherein the nozzle housing comprises a hardened inner surface defining the hot runner passage, the inner surface having a lubricity effective to enhance sliding movement of the nozzle tip section relative to the nozzle housing.

3. The nozzle assembly of claim 2, wherein the hardened inner surface is formed by a nitriding process.

4. The nozzle assembly of claim 1, wherein the hot runner tip passage is straight.

5. The nozzle assembly of claim 1, wherein the hot runner tip passage is spiral shaped.

6. The nozzle assembly of claim 5, wherein the nozzle tip section comprises a spiral shaped tip member disposed in the hot runner tip passage.

7. The nozzle assembly of claim 6, wherein the spiral shaped tip member is comprised of a material having high abrasion resistance to the plastic resin melt.

8. The nozzle assembly of claim 1, wherein the upper nozzle tip portion comprises an outer wall formed of a material having a higher coefficient of thermal expansion than the material forming the nozzle housing such that a plastic resin melt seal is formed between the nozzle housing and the outer wall during injection molding.

9. The nozzle assembly of claim 8, wherein the nozzle housing is comprised of steel and the outer wall of the upper nozzle tip portion is comprised of a beryllium-copper material.

10. The nozzle assembly of claim 9, wherein the outer wall of the nozzle tip section is nickel plated.

11. The nozzle assembly of claim 1, wherein the length of the lower nozzle tip portion subject to thermal expansion is defined by the portion that extends beneath or below the limiting means.

12. The nozzle assembly of claim 1, wherein the hot runner passage comprises an upper portion having an upper diameter and a lower portion adjacent to the upper portion having a lower diameter greater than the upper diameter.

13. The nozzle assembly of claim 12, wherein the nozzle tip section is received in the lower portion of the hot runner passage.

14. A nozzle assembly for injecting a plastic resin melt into a mold cavity through a gate, the nozzle assembly comprising:
   a) a nozzle housing defining a hot runner passage therethrough for flowing a plastic resin melt, the hot runner passage having a longitudinal axis; and
   a nozzle tip section including a nozzle tip and a hot runner tip passage in flow communication with the hot runner passage for flowing the plastic resin melt, the nozzle tip section being freely slidable relative to the nozzle housing in the hot runner passage along the longitudinal axis during injection of the plastic resin melt into the mold cavity such that axial thermal expansion of the nozzle housing is not imparted to the nozzle tip section, the nozzle tip section including limiting means for limiting axial sliding movement of the nozzle tip section relative to the nozzle housing and to the gate and for limiting the length of the nozzle tip section that can axially thermally expand during injection.

15. The nozzle assembly of claim 14, wherein the length of the nozzle tip section that can axially thermally expand comprises a lower portion of the nozzle tip section extending upwardly from the nozzle tip to approximately an upper face of the limiting means.

16. The nozzle assembly of claim 14, wherein the nozzle tip section comprises an outer wall formed of a material having a higher coefficient of thermal expansion than the material forming the nozzle housing such that a plastic resin melt seal is formed between the nozzle housing and the outer wall during injection molding.

17. The nozzle assembly of claim 16, wherein the nozzle housing comprises an inner surface layer defining the hot runner passage, the nozzle tip section comprises an outer layer, the inner surface layer and the outer layer having a lubricity effective to enhance sliding movement of the nozzle tip section relative to the nozzle housing.

18. The nozzle assembly of claim 14, wherein the hot runner tip passage is spiral shaped.

19. A nozzle assembly for injecting a plastic resin melt into a mold cavity through a gate, the nozzle assembly comprising:
   a) a nozzle housing defining a hot runner passage therethrough for flowing a plastic resin melt, the hot runner passage having a longitudinal axis, the nozzle housing being formed of a first material having a first coefficient of thermal expansion; and
   a nozzle tip section including a nozzle tip, the nozzle tip section being freely slidably received in the hot runner passage along the longitudinal axis, the nozzle tip section defining a hot runner tip passage in flow communication with the hot runner passage for flowing the plastic resin melt, the nozzle tip section including a portion formed of a second material having a second coefficient of thermal expansion greater than the first coefficient of thermal expansion such that a plastic resin melt seal is formed between the nozzle tip section and the nozzle housing during injection molding, the nozzle tip section including limiting means for limiting sliding movement of the nozzle tip section along the longitudinal axis relative to the nozzle housing and to the gate and for limiting axial thermal expansion of the nozzle tip section to a lower portion of nozzle tip section including the nozzle tip, during infection of the plastic resin melt into the mold cavity.

20. A nozzle assembly for injecting a melt into a mold cavity through a gate, the nozzle assembly comprising:
   a) a nozzle housing including a hot runner passage therethrough for flowing a melt, the hot runner passage having a longitudinal axis;
   b) a nozzle tip section including an outer surface, an axial hot runner tip passage in flow communication with the hot runner passage for flowing the melt, and a tip, the nozzle tip section being freely axially slidable within the hot runner passage relative to the nozzle housing during injection of the melt into the mold cavity; and
   c) a nozzle tip locator support disposed on the outer surface of the nozzle tip section to (i) restrict axial sliding movement of the nozzle tip section in a direction toward the gate, and to (ii) restrict axial thermal expansion of the nozzle tip section in a direction toward the gate, such that the tip is automatically positioned relative to the gate during the injection of the melt.

21. A nozzle assembly for injecting a melt into a mold cavity through a gate, the nozzle assembly comprising:
   a) a nozzle housing including a hot runner passage therethrough for flowing a melt, the nozzle housing having a first coefficient of thermal expansion;
   b) a nozzle tip section non-fixedly received in the hot runner passage, the nozzle tip section including an outer surface, and a hot runner tip passage in flow communication with the hot runner passage for flowing the melt, the nozzle tip section including a portion having a second coefficient of thermal expansion greater than the first coefficient of thermal expansion such that a plastic resin melt seal is formed between the outer surface of the nozzle tip section and the nozzle housing during injection molding; and
   c) a titanium nozzle tip locator support positioned on the outer surface of the nozzle tip section such that during injection molding the nozzle tip locator support (i) limits freely sliding movement of the nozzle tip section along the longitudinal axis relative to the nozzle housing and to the gate, and (ii) limits thermal expansion of the nozzle tip section along the longitudinal axis to a lower portion of nozzle tip section.

* * * * *